Oct. 16, 1956 — J. W. WILLIAMSON — 2,767,236
MAGNETIC STIRRER FOR MOLTEN METAL FURNACES
Filed Oct. 14, 1954 — 2 Sheets—Sheet 1
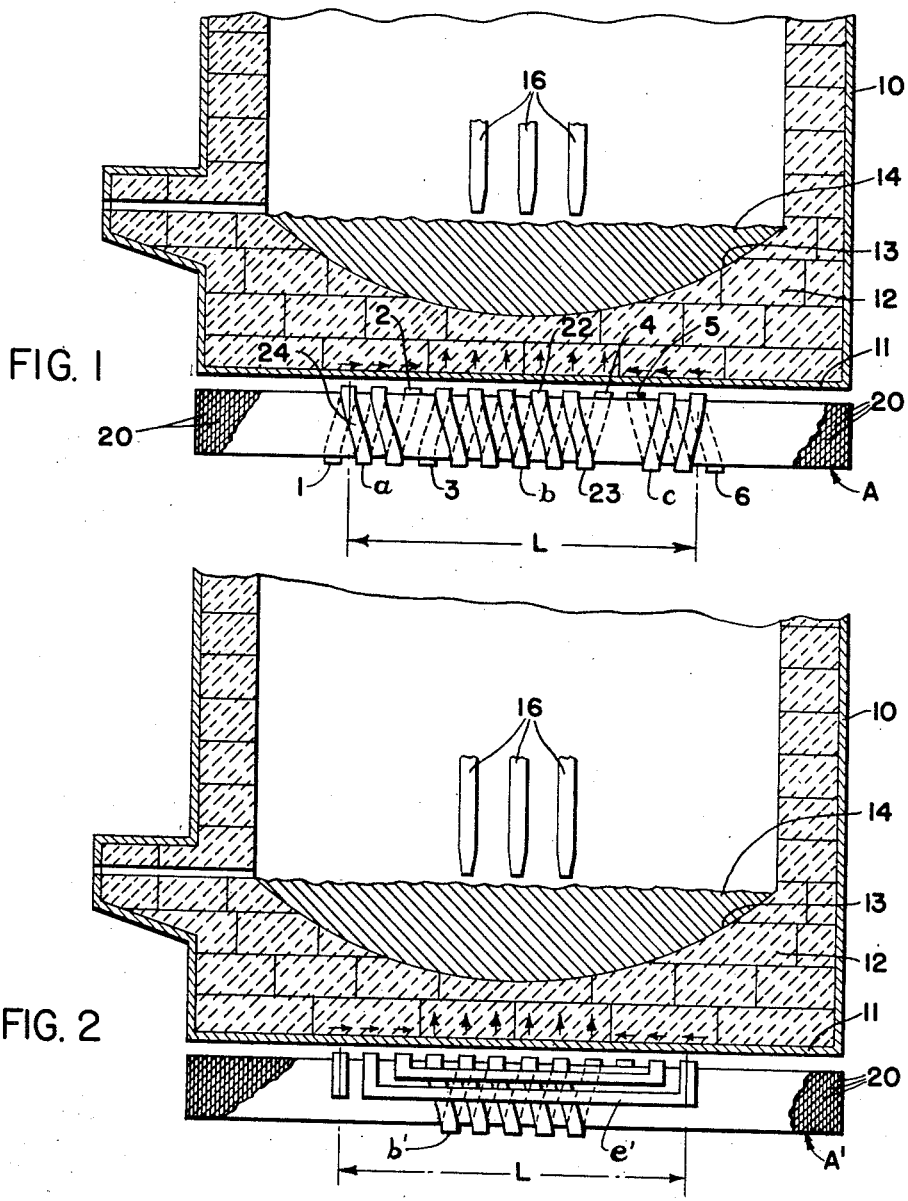
INVENTOR.
JAMES W. WILLIAMSON
BY
ATTORNEY Oct. 16, 1956  J. W. WILLIAMSON  2,767,236
MAGNETIC STIRRER FOR MOLTEN METAL FURNACES
Filed Oct. 14, 1954  2 Sheets-Sheet 2

INVENTOR.
JAMES W. WILLIAMSON
BY
ATTORNEY

2,767,236
MAGNETIC STIRRER FOR MOLTEN METAL FURNACES

James W. Williamson, Cleveland, Ohio

Application October 14, 1954, Serial No. 462,290

7 Claims. (Cl. 13—26)

This invention pertains to the art of refining metal while in the molten state and, more particularly, to an induction stirrer for such metals.

The invention particularly applies to the stirring of steel when being refined in an arc furnace and will be described with particular reference thereto, although it will be appreciated that the invention has broader applications.

In the art of refining steel in an arc furnace, a ladle is provided having an outer steel shell and an inner liner of refractory material of a substantial thickness intended both to prevent the molten metal from coming in contact with the steel shell and to provide heat insulation therefor. Carbons electrically energized are positioned in the top of the ladle and an arc is struck between the carbons and the surface of the steel. The heat from the arc tends to refine the steel. In order to obtain a more homogeneous product, it is desirable to stir the molten steel during this refining operation. It is known to provide magnetic or induction stirrers for the steel positioned below the bottom of the furnace. Such stirrers create a magnetic field which threads through the bottom of the furnace into the molten steel. The magnetic field is created by a plurality of electrically energized coils energized from a multiphase electrical power source. The magnetic field tends to go across the bottom of the furnace in one direction only like a fan and causes the molten metal to move in a circular path just as though it were the rotor of a motor.

Heretofore, the coils employed in the stirrer were what may be termed "pancake" windings; that is to say, one side of the windings passed under the furnace with the currents therein flowing in one direction and returned in the same plane but spaced a substantial distance therefrom with the currents flowing thus in the opposite direction. With such a pancake winding, it will be seen that the axis of the coil was generally perpendicular to the bottom of the furnace. Stated alternatively, the axis of the coil extended into the molten bath of metal.

The amount of stitrring which can be obtained from a given magnetic field varies directly by the square of the strength of the magnetic field imposed on or reaching the molten metal. Theoretical calculations have shown that the strength of this magnetic field reaching the molten metal decreases very rapidly as the spacing between the plane of the coils and the lower surface of the molten metal is increased. However, such spacing must be substantial because of the need for the refractory material at the bottom of the furnace.

Accordingly, in order to obtain any substantial amounts of stirring action, it has been found heretofore necessary to use extremely high electrical power in the induction stirrer. Such high power requires extremely large electrical conductors and an extremely large magnetic core to prevent flux saturation and a relatively heavy and expensive installation.

Another factor which has entered into the strength of the magnetic field reaching the bottom of the molten metal has been what may be termed the effective length of the coil. This distance may generally be defined as the distance between where the flux leaves the coil in one direction to return in the opposite direction; that is to say, the distance between a north and south pole. Stated alternatively, it is the distantce on the coil between which the direction of the currents is in 180 degree phase opposition.

If the last referred to distance be designated by the letter L and the spacing between the bottom of the molten metal and the plane of the coil be designated by the letter $d$, theoretical calculations have shown that the force of the magnetic field reaching the bottom of the molten metal will be proportional to the equation $e^{-\pi d/L}$, wherein $e$ equals 2.72 approximately.

In this formula, it will be seen that as L goes up or as $d$ goes down, the flux density reaching the bottom of the magnetic metal will go up.

The factor $d$ cannot generally be decreased without reconstructing the furnace itself or placing the magnetic stirrer on the interior of the furnace which has been found to be extremely undesirable. The factor $d$ has been found to be equal to about one-sixth the diameter of the furnace. In the prior art, the factor L must, due to limitations of the coil design which the present invention proposes to overcome, be not more than one-half the diameter of the furnace. If we assume L to be equal to one-half the diameter of the furnace, then the factor $d/L$ will be equal to one-third. Applying this fraction in the above formula indicates that the stirring force will be approximately eleven percent of that obtainable if the lower surface of the molten metal were immediately adjacent to the planes of the coils.

Using the prior-art designs, the dimension L cannot generally be made equal to one-half the diameter of the furnace without increasing the average value of the factor $d$. This is so because L with the prior-art designs cannot be greater than one-half the total length of the coil. Any greater length of windings would place the outermost turns spaced beyond the limits of the furnace and, thus, the magnetic field created by these outermost windings would have little effect on the molten charge.

The present invention provides an induction or magnetic stirrer for molten metal in furnaces of the type to be positioned below the bottom of the furnace which is simple in construction, relatively small in size and permits a very substantial improvement in operating efficiency.

In accordance with the invention, a magnetic stirrer is provided comprised of a plurality of multiphase coils positioned (in aligned relationship) below the bottom of the ladle or furnace with the axis of at least one of these coils parallel to the bottom of the furnace; that is to say, the axis of such coil or coils does not pass into the interior of the furnace. Generally such coil or coils are flat sided with one side of the coil being close to the bottom of the furnace and the opposite or return side of the coil being spaced from the furnace. A magnetic core extends along the axis of the coils for the purpose of decreasing the reluctance of the magnetic path.

With such a construction, it will be seen that the factor L can be equal to approximately the total width of the stirrer windings as distinguished from only one-half the total width of the stirrer windings as heretofore known. As a minimum, the factor L can be increased by at least twenty-five percent. Calculations based on such an increase in length indicates that the stirring action obtainable is seventeen percent of that available when the coils are placed directly adjacent to the lower surface of the molten metal. This is an improvement of fifty-five percent.

Further, the present invention enables the total conductor length to be much shorter, giving a lower $I^2R$ loss in the coils and permits a greater concentration of the magnetic flux directly below the molten metal, thus further increasing the stirring action for the same amounts of electrical power employed.

Stated alternatively, employing the invention, the same amount of stirring action can be obtained using substantially lesser amounts of electrical energizing apparatus.

The principal object of the invention is the provision of a new and improved induction stirrer for molten metal in the ladle which is simple in construction, gives a maximum stirring action and requires a minimum amount of electrical energy for such action.

Still another object of the invention is the provision of a new and improved induction stirrer for molten metal in furnaces comprised of a plurality of multiphase coils positioned beneath the bottom of the furnace and energized from a multiphase power source, the axis of at least one of said coils being generally parallel to the bottom of the furnace.

Still another object of the invention is the provision of a new and improved induction stirrer to be placed below the bottom of a ladle containing molten metal comprised of a magnetic steel core extending generally parallel to the bottom of the ladle and having wound therearound a plurality of windings each connected to a different phase of a multiphase power source.

Still another object of the invention is the provision of a new and improved induction stirrer to be placed below the bottom of a ladle containing molten metal, the arrangement of windings in said stirrer being such that, progressing from one end to the other end of the stirrer windings in the direction perpendicular to the conductors and parallel to the bottom of the ladle or furnace, the phase angle between the currents in the outermost conductors of the stirrer winding is 180 degrees, rather than 360 degrees as in the prior art.

The invention may be embodied in certain parts and arrangements of parts, a preferred embodiment of which will be described in this specification in such detail as to enable one skilled in the art to use the invention and illustrated in the accompanying drawings which are a part hereof, and wherein:

Figure 1 is a side cross-sectional view somewhat schematically of an electric arc furnace having positioned therebelow an induction stirrer illustrating a preferred embodiment of the present invention.

Figure 2 is a view similar to Figure 1, showing an alternative embodiment of the invention.

Figure 3:
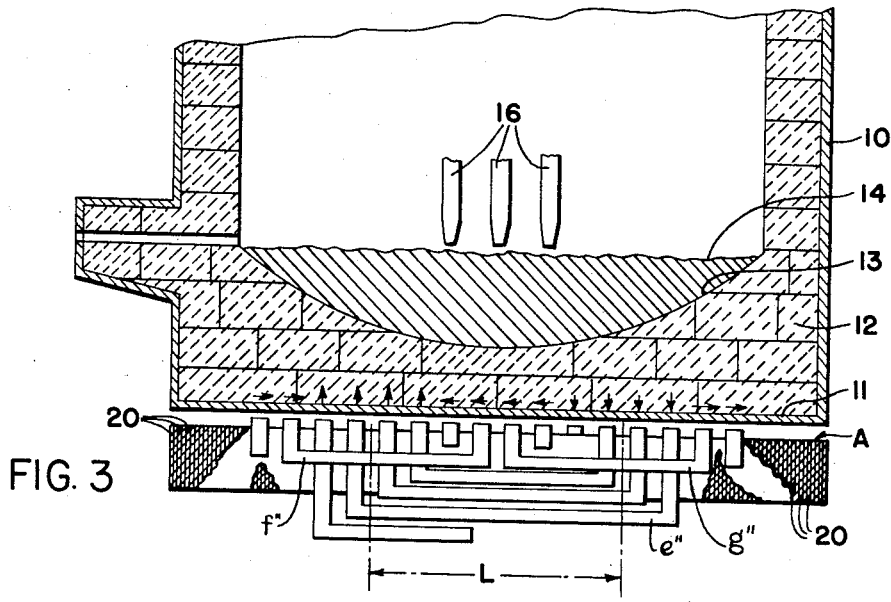
Figure 3 is a view similar to Figures 1 and 2, and drawn approximately on the same scale, showing the relationship of the coils of the prior art to the molten metal.
Figure 4:
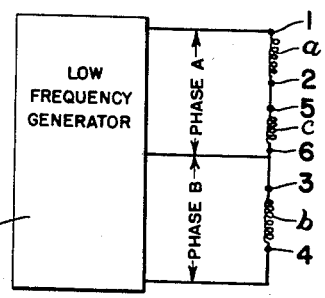
Figure 5:
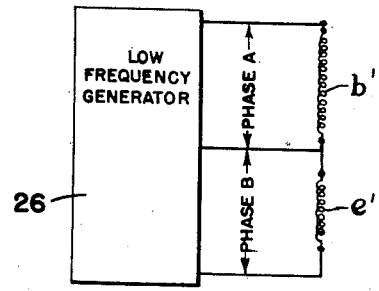
Figure 6:
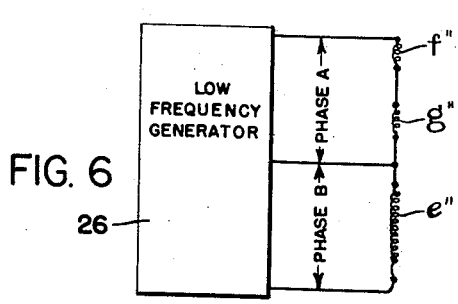

Figures 4, 5, and 6 are wiring diagrams, respectively, for the arrangements of Figures 1, 2, and 3.

Referring now to the drawings wherein the showings are for the purposes of illustrating preferred embodiments of the invention and not for the purposes of limiting the invention, Figure 1 shows somewhat schematically a cross section of a relatively conventional electric arc furnace comprising an outer shell 10 and having a base 11, an inner refractory lining 12 mounted in the shell 10 and having a curved or concave upper surface 13 to form a base or bed for molten metal 14, such as steel or the like. A plurality of carbons 16, as are conventional, connected to a suitable source of electrical energy (not shown), have an arc maintained between the lower end thereof and the upper surface of the metal 14 to provide heat to the metal 14 and maintain the metal in a molten state.

A refractory 12 may be of any known substantially non-electrical-conducting material.

The base 11 of the ladle 10 may also be made of any known metallic material but is preferably made of a material having a high electrical resistivity. Stainless steel either magnetic or nonmagnetic may be employed. Ordinary carbon steel, while not quite as satisfactory, may also be used. For reasons which will appear hereinafter, the base need not be made of a nonmagnetic material.

The induction stirrer indicated generally at A constructed in accordance with the present invention is comprised generally of a stack of magnetic laminations 20 with the plane of each lamination oriented so as to be generally vertical and extending generally parallel to the bottom 11. Any length of lamination may be employed, but a length approaching the general diameter of the ladle 10 is preferred. A plurality of coils of one or a plurality of layers indicated generally at a, b and c are wound around the stack of magnetic laminations 20. As shown, each coil is comprised generally of a plurality of turns of electrically conductive material with the axis thereof generally in alignment and parallel to the base 11. Thus, each coil is comprised of a plurality of generally flat coil sides, an upper coil side 22 extending over the upper surface of the laminations 20 and lower coil sides 23 extending under the laminations 20. Each of these coil sides 22 and 23 are electrically interconnected by vertically extending portions 24. There are three coils shown and the coil a has terminals 1 and 2 while the coil b has terminals 3 and 4 and the coil c has terminals 5 and 6. These terminals are electrically interconnected as shown in Figure 4 to a suitable source of multiphase electrical energy 26. The frequency and number of phases of the alternating current of the power source 26 may be as desired but, preferably, is on the order of one-half cycle per second, and two phase respectively.

While not specifically shown in the drawings, obviously each conductor making up the windings will be electrically insulated both from the laminations 20 from each other and from the base of the furnace 11. The particular method of insulating the individual inductors forms no part of the present invention and will not be described further herein.

The coils a, b and c are shown as each being independent one from the other and without any interleaving of the winding. Obviously, if desired, the ends of the various windings may be partly interwound so as to produce a more nearly sinusoidal translating magnetic field. The particular interleaving of the ends of the coils forms no part of the present invention and will not be described further herein.

Figure 2 shows a second embodiment of the invention. Certain parts of the embodiment of the invention illustrated in Figure 2 are similar to parts of the embodiment of the invention illustrated in Figure 1, and certain parts of the embodiment of the invention illustrated in Figure 2 are similar to parts shown in Figure 3 (depicting the prior art arrangement).

Similar parts are designated by similar characters thruout, but without primes in Figure 1 (and Figure 4), with single primes in Figure 2 (and Figure 5), and double primes in Figure 3 (and Figure 6). It will be seen that in the embodiment of the invention illustrated in Figure 2 one of the windings, designated by the character b', has its axis parallel with the bottom of the furnace, while a second winding, designated by the character e, has its axis perpendicular to the bottom of the furnace. By way of comparison, the winding b' of Figure 2 is similar to the winding b of Figure 1, while the winding e' of Figure 2 is similar to the winding e'' of Figure 3. The prior art construction of induction stirrer illustrated by Figure 3 is well known and will not be described here, other than to point out that the three stirrer windings, e'', f'', and g'' are flat or "pancake" type coils with their axis perpendicular to the bottom of the furnace.

In Figures 1, 2, and 3, the phase relations between currents in the various conductors thru which currents flow setting up a field acting on the molten charge are indicated by vectors. These vectors are shown as small arrows, each of which is drawn above its respective conductor. For definitness, it will be assumed that a vector pointing to the right above a specific conductor indicates the instantaneous current through that conductor is maximum in the inward or into-the-paper direction at the instant under consideration. Then, according to conventions well established in electrical engineering, a vector pointing to the left indicates negative maximum current in the inward direction or maximum current in the outward direction. A vector pointing directly upward or directly downward indicates zero instantaneous current through the conductor over which the vector is drawn. It will be assumed, that on the basis of the conventions described above, the electrical connections to the power source are such as to make the vectors representing the currents in the various conductors revolve in the counterclockwise direction. Then Figures 1, 2, and 3 show a phase relationship between the currents in the various conductors such as would produce a magnetic field translating to the left and produce a generally clockwise motion of the molten charge. It will be obvious that the furnace opening could be on either the left or right, so that the direction of motion of the molten charge near the bottom of the furnace could be either toward or away from the opening of the furnace. In fact, by a simple and obvious change in electrical connections or in the direction of rotation of the electrical generator to which the stirrer windings are connected, the direction of motion of the charge may be reversed. The methods by means of which the direction of motion of the molten charge may be reversed are well known and do not form a part of this invention.

As hereinbefore indicated, the flux intensity reaching the metal 14 is proportional to the quantity $e^{-\pi d/L}$, wherein $d$ equals the distance from the molten metal 14 to the upper surface of the coil, and L is the effective distance between conductors in the stirrer winding carrying currents 180 degrees out of phase. For prior art induction stirrers, such as illustrated by Figure 3, the total phase shift in currents progressing from one conductor to another along the entire width of the stirrer winding is 360 degrees. Therefore, L is equal to one-half the width of the winding for prior art induction stirrers. It can be seen from either Figure 1 or Figure 2 that in accordance with the present invention there is only a 180 degree phase shift in currents progressing from one conductor to another along the entire width of the stirrer winding. Therefore, L is made equal to the entire width of the stirrer winding. Thus, it will be seen that the present invention permits a very substantial increase in the amount of magnetic flux which will reach the molten metal 14.

It will be noted that the individual turns of the coils $a$, $b$ and $c$ in Figure 1 or $b'$ and $e'$ in Figure 2 are spaced one from the other. It is desired that each of these coils have the maximum magnetic coupling with the metal 14. Various means known in the art may be employed for this purpose.

With previous magnetic or induction stirrers for electrical arc furnaces, the problems of getting a sufficient magnetic field to the molten metal to provide the proper amount of stirring with reasonable power input to the coil has been such that it has always been necessary to form the bottom 11 of the ladle from a nonmagnetic steel. Because of the great increase of useable magnetic flux at the molten metal itself employing the present invention, it has been found possible to manufacture the bottom 11 from either magnetic or nonmagnetic materials. It will be appreciated that very substantial amounts of magnetic flux are created by the coils $a$, $ba$ and $c$ or $b'$ and $e'$ and such coils very quickly saturate the magnetic properties of the furnace bottom. Such material saturates at relatively low values of magnetic flux such that once the magnetic bottom is saturated, the flux passes therethrough in the same manner as though the material were nonmagnetic. It is desirable, however, that the material have a relatively high electrical resistance so as to reduce the losses due to electric currents induced therein to a minimum.

It will be appreciated that modifications and alterations will occur to others upon a reading and understanding of this specification and it is my intention to include all such modifications and alterations insofar as they come within the scope of the appended claims.

Having thus described my invention, I claim:

1. In combination with a container for molten metals and having a bottom, an induction stirrer for such metal comprising a plurality of stationary electrical coils positioned adjacent the bottom of said furnace, said coils having a combined axial length at least greater than one-half of a parallel cross dimension of said bottom one or more of said coils having an axis of the winding thereof generally parallel to said bottom and a multiphase power source for energizing said coils, said coils being so arranged that the flux of one coil overlaps the flux of an adjacent coil in the molten metal.

2. In combination with a container for molten metals having a bottom, an induction stirrer for such metal comprising a plurality of stationary electrical coils in axial alignment positioned adjacent to said bottom, said coils having a combined axial length at least greater than one-half of a parallel cross dimension of said bottom all of said coils having an axis generally parallel to said bottom and multiphase power connections for energizing said coils, said coils being so arranged that the flux of one coil overlaps the flux of an adjacent coil in the molten metal.

3. In combination with a container for molten metals and having a bottom, an induction stirrer for such metal comprising a plurality of stationary electrical coils at least some of which are in axial alignment and having an axis of winding generally parallel to said bottom, said coils having a combined axial length at least greater than one-half of a parallel cross dimension of said bottom a magnetic core extending through all of said axially aligned coils and multiphase power connections for energizing said coils, said coils being so arranged that the flux of one coil overlaps the flux of an adjacent coil in the molten metal.

4. In combination with a container for molten metals having a bottom, an induction stirrer for such metal comprising a magnetic core member having an upper surface in generally close-spaced relationship to said bottom and a plurality of stationary electrical coils each comprised of a plurality of complete turns about said core, said coils having a combined axial length at least greater than one-half of a parallel cross dimension of said bottom one side of each turn extending over the upper side of said core arnd the opposite side extending thereunder, said coils being so arranged that the flux of one coil overlaps the flux of an adjacent coil in the molten metal.

5. In combination with a container for molten metals having a bottom, an induction stirrer for such metal comprising a magnetic core in generally close relationship to said bottom and extending generally parallel thereto, a plurality of stationary electrical coils about said core, said coils having a combined axial length at least greater than one-half of a parallel cross dimension of said bottom each coil consisting of an upper side extending generally between said core and said bottom and a lower side extending across the side of said core remote from said bottom, said coils being so arranged that the flux of one coil overlaps the flux of an adjacent coil in the molten metal.

6. In combination with a container for molten metals having a bottom, an induction stirrer for such metal comprising a magnetic core in generally close relationship to said bottom and extending generally parallel thereto, a plurality of stationary electrical coils at least one of which is wound about said core and consisting of an upper side extending generally between said core and said bottom and a lower side extending across the side of said core remote from said bottom, said coils having a combined axial length at least greater than one-half of a parallel cross dimension of said bottom said bottom being formed of magnetic stainless steel material and means for energizing said coils from a multiphase power source of sufficient energy to provide a magnetic flux to saturate said steel bottom with magnetic flux, said coils being so arranged that the flux of one coil overlaps the flux of an adjacent coil in the molten metal.

7. In combination with a container for molten metals and having a bottom, an induction stirrer for such metal comprising at least three stationary electrical coils in axial alignment positioned adjacent said bottom, said coils having an axis of winding generally parallel to said bottom, said coils having a combined axial length at least greater than one-half of a parallel cross dimension of said bottom the centermost of said coils having a greater number of turns than the other two coils, said coils being so arranged that the flux of one coil overlaps the flux of an adjacent coil in the molten metal.

References Cited in the file of this patent

UNITED STATES PATENTS

| | | |
|---|---|---|
| 1,013,359 | Appel | June 2, 1912 |
| 1,076,887 | Howard | Oct. 28, 1913 |
| 1,851,984 | Rennerfelt | Apr. 5, 1932 |
| 1,937,065 | Moore | Nov. 28, 1933 |
| 2,513,082 | Dreyfus | June 27, 1950 |
| 2,620,366 | Ladell | Dec. 2, 1952 |
| 2,652,441 | Gynt et al. | Sept. 15, 1953 |
| 2,686,823 | Jones | Aug. 7, 1954 |